(12) United States Patent
Yu

(10) Patent No.: US 8,836,885 B2
(45) Date of Patent: Sep. 16, 2014

(54) OUTER FRAME OF DISPLAY DEVICE, BACKLIGHT MODULE AND LCD DEVICE

(75) Inventor: Yajun Yu, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 121 days.

(21) Appl. No.: 13/504,957

(22) PCT Filed: Apr. 1, 2012

(86) PCT No.: PCT/CN2012/073468
§ 371 (c)(1),
(2), (4) Date: Apr. 29, 2012

(87) PCT Pub. No.: WO2013/143154
PCT Pub. Date: Oct. 3, 2013

(65) Prior Publication Data
US 2013/0258230 A1 Oct. 3, 2013

(30) Foreign Application Priority Data
Mar. 27, 2012 (CN) .......................... 2012 1 0082734

(51) Int. Cl.
*G02F 1/1333* (2006.01)
(52) U.S. Cl.
USPC .......................................................... 349/58
(58) Field of Classification Search
USPC .......................................................... 349/58
See application file for complete search history.

(56) References Cited

U.S. PATENT DOCUMENTS 6,867,827 B2 * 3/2005 Cha et al. .......................... 349/65
7,377,682 B2 * 5/2008 Chang et al. ................... 362/633
(Continued)

FOREIGN PATENT DOCUMENTS

| CN | JP9105935 A | 4/1997 |
| CN | 1612022 A | 5/2005 |

(Continued)

OTHER PUBLICATIONS

Yang Yunfeng, the second office action, Jun. 2013, CN.

(Continued)

*Primary Examiner* — James Dudek
(74) *Attorney, Agent, or Firm* — Na Xu; IPro, Inc.

(57) ABSTRACT

The invention provides an outer frame for a display device, a backlight module and an LCD device. The outer frame includes at least two sections; the sections include a mounting section for arranging the light source of the backlight module. In the invention, because the outer frame of the backlight module is divided into multiple sections, and one of the sections is used as a mounting section for arranging the light source, the light source is arranged on the mounting section of the outer frame when being assembled, and the required assembling action is simple in the assembling process; thus, the step of assembling the light source on the backplane or aluminum extrusion is omitted, and the assembling technology is simplified. In addition, when replacing the light source of the backlight module, only the mounting section of the outer frame is removed, and then the light source is replaced on the outer frame. Thus, most components of the backlight module are exposed into air because many components are removed, causing dust to enter inside the backlight module to affect the optical performance of the backlight module can be avoided, the replacement process of the light source can be simplified, and the stability of the LCD device can be increased.

4 Claims, 6 Drawing Sheets

(56) References Cited

U.S. PATENT DOCUMENTS

| | | | |
|---|---|---|---|
| 8,021,032 B2* | 9/2011 | Pei | 362/612 |
| 8,050,023 B2* | 11/2011 | Lee et al. | 361/679.24 |
| 8,109,667 B2* | 2/2012 | Wang et al. | 362/633 |
| 8,125,588 B2* | 2/2012 | Pei | 349/58 |
| 8,184,239 B2* | 5/2012 | Kwak | 349/69 |
| 8,253,875 B2* | 8/2012 | Kim | 349/58 |
| 8,253,886 B2* | 8/2012 | Jeong et al. | 349/65 |
| 8,384,846 B2* | 2/2013 | Park et al. | 349/65 |
| 2007/0263347 A1 | 11/2007 | Hong et al. | |
| 2010/0277664 A1* | 11/2010 | Kim et al. | 349/58 |

FOREIGN PATENT DOCUMENTS

| | | |
|---|---|---|
| CN | 2699332 Y | 5/2005 |
| CN | 101042485 A | 9/2007 |
| CN | 101178507 A | 5/2008 |
| CN | 101303479 A | 11/2008 |
| CN | 201266280 Y | 7/2009 |
| CN | 101498860 A | 8/2009 |
| CN | 101573554 A | 11/2009 |
| CN | 101592820 A | 12/2009 |
| CN | 101644421 A | 2/2010 |
| CN | 102374500 A | 3/2012 |
| CN | 102384409 A | 3/2012 |
| KR | 100764447 B1 | 9/2007 |

OTHER PUBLICATIONS

Li Qingqing, the International Searching Authority written comments, Jan. 2013, CN.

Yang Yunfeng, the first office action, Dec. 2012, CN.

* cited by examiner

OUTER FRAME OF DISPLAY DEVICE, BACKLIGHT MODULE AND LCD DEVICE

TECHNICAL FIELD

The invention relates to the field of liquid crystal displays (LCDs), and more particularly to an outer frame of a display device, a backlight module and an LCD device.

BACKGROUND

As a key component of an LCD device, a backlight module is mainly used for providing sufficient brightness and uniformly distributed light sources, to enable an LCD panel to normally display images.

A light source of the backlight module is provided by a light source arranged in the module. Take an light emitting diode (LED) light source as an example, the LED light source is provided with multiple LEDs, and the performance and service condition of the LEDs are affected by various factors. If one or more LEDs of the backlight module cannot emit light because of failure during use, the display performance of the LCD device will be affected, and the LCD device even cannot display. FIG. 1 shows a backlight module of an LCD device, including a backplane 100, a light source 140 fixed on the side wall of the backplane 100, a reflector plate 110 arranged on the backplane 100, a light guide panel (LGP) 120 which is arranged on the reflector plate 110 and opposite to the light source 140, a rubber frame 150 and an outer frame 200 which are arranged outside the backplane 100 and used for pressing the LGP 120; an optical film 130 is arranged on the light emitting surface of the LGP 120, and an LCD panel 300 is fixed above the backlight module by components including the rubber frame 150, the outer frame 200 and the like. FIG. 2 shows an LCD module comprising the backlight module. If one or more LEDs of the light source 140 of the backlight module are damaged, when repairing the damaged LED(s), the backlight module needs to be removed in sequence, and the front frame 200, the LCD panel 300, the rubber frame 150, the optical film 130, the LGP 120, the reflector plate 110 and the like need to be removed, thus, the process is complicated. Furthermore, vulnerable components such as the LCD panel 300, the optical film 130 and the like may be easily damaged in the process of removal or assembly, and positioning error may be caused in the process of repeated removal or assembly. For example, if positioning error is generated in the LGP 120 and the light source 140 in the process of removal or assembly, the display quality of the repaired LCD device will be affected. In addition, when assembling the light source 140, the assembling operation is required to be performed on the side wall of the backplane 100, and the assembling process is inconvenient, thereby resulting in complicated assembling action, and then affecting the assembling efficiency of the backlight module.

U.S. Pat. Pub. No. US2007/0263347 discloses a method for assembling an LCD panel, and discloses an outer frame. As shown in FIG. 3, the periphery of an outer frame 200 is provided with side walls to form a closed surrounding structure, and components including an LCD panel, an LGP and the like are arranged under the outer frame 200 in sequence. Therefore, if the light source of the backlight module is assembled or removed, the process is also complicated as that of the aforementioned method. The assembly or removal of the light source seriously affects the production efficiency and stability of the LCD device.

SUMMARY

In view of the above-described problems, the aim of the invention is to provide an outer frame of a display device, a backlight module and an LCD device capable of conveniently replacing light source.

The aim of the invention is achieved by the following technical scheme.

An outer frame of an LCD device comprises at least two sections, wherein the sections comprise a mounting section for arranging the light source of the backlight module.

Preferably, the four edge sections of the outer frame respectively comprise a top section, a bottom section and two side sections which are independent; the mounting section is any edge section of the outer frame. The four edge sections can be formed by cutting the same strip-shaped original workblanks. Thus, the production efficiency of the outer frame can be increased, and complicated molds are not needed, thereby saving the production cost.

Preferably, the four edge sections of the outer frame respectively comprise a mounting section, and a combining section; the combining section comprises three integratedly molded edge sections of the outer frame; and the mounting section is any section of the top section, the bottom section and the two side sections of the outer frame. Thus, the number of the sections is reduced, thereby facilitating the assembling of the outer frame, and increasing the assembling efficiency.

Preferably, the four edges section of the outer frame respectively comprise a mounting section, and a positioning section; the mounting section comprises three integratedly molded edge sections of the outer frame. The main aim of such arranging mode is to facilitate positioning and assembling. Because the light source is required to be accurately positioned, the mounting section comprising the three edge sections is beneficial to the positioning of the light source.

A backlight module of a display device comprises a light source, and an outer frame mentioned above; the light source is fixed on the mounting section of the outer frame.

Preferably, the backlight module comprises a backplane, and a rubber frame; the backplane and the rubber frame are provided with a receiving structure for receiving the light source. Thus, the light source can be accurately arranged on the outer frame.

Preferably, the receiving structure is a through hole arranged in the backplane and the rubber frame corresponding to the light source. Thus, the light source is conveniently arranged and positioned, and the strength of the backplane and the rubber frame is prevented from being greatly changed.

Preferably, the light source is fixed on a strip-shaped mounting strip, the mounting strip is provided with an insert hole in the position corresponding to the through hole, and the mounting strip is arranged and fixed in the insert hole. By using the strip, the assembling speed of the light source can be improved, and the production efficiency can be improved.

Preferably, the mounting strip is made of material with good heat dissipation effect. Because the mounting strip is closely attached to the light source, the mounting strip is used as a heat sink to provide a heat dissipation path, thereby improving the heat dissipation efficiency of the backlight module.

An LCD device comprises a backlight module mentioned above.

In the invention, because the outer frame of the backlight module is divided into multiple sections, and one of the sections is used as a mounting section for arranging the light source. The light source is arranged on the mounting section of the outer frame when being assembled, the required assembling action is simple in the assembling process, and the assembling of the light source is completed when the outer frame is assembled; thus, the step of assembling the light source on the backplane or aluminum extrusion is omitted, and the assembling technology is simplified. In addition, when replacing the light source of the backlight module, only the mounting section of the outer frame is removed, and then the light source is replaced on the outer frame without removing components such as the LCD panel, the optical film, the LGP, etc. Thus, most components of the backlight module are exposed into air because many components are removed, causing dust to enter inside the backlight module to affect the optical performance of the backlight module can be avoided, the replacement process of the light source can be simplified, and the stability of the LCD device can be increased.

LEGENDS 100. backplane; 110. reflector plate; 120. LGP; 130. optical film; 140. light source; 150. rubber frame; 170. support piece; 180. air cavity; 190. heat conducting plate; 141. LED; 142. PCB; 151. inner edge; 210. lug boss; 212 mounting strip; 200. outer frame; 201. mounting section; 202. side section; 203. top section; 204. bottom section; 205. combining section; 206. positioning section.

DETAILED DESCRIPTION

The invention will further be described in detail in accordance with the figures and the preferred examples.

Figure 4:
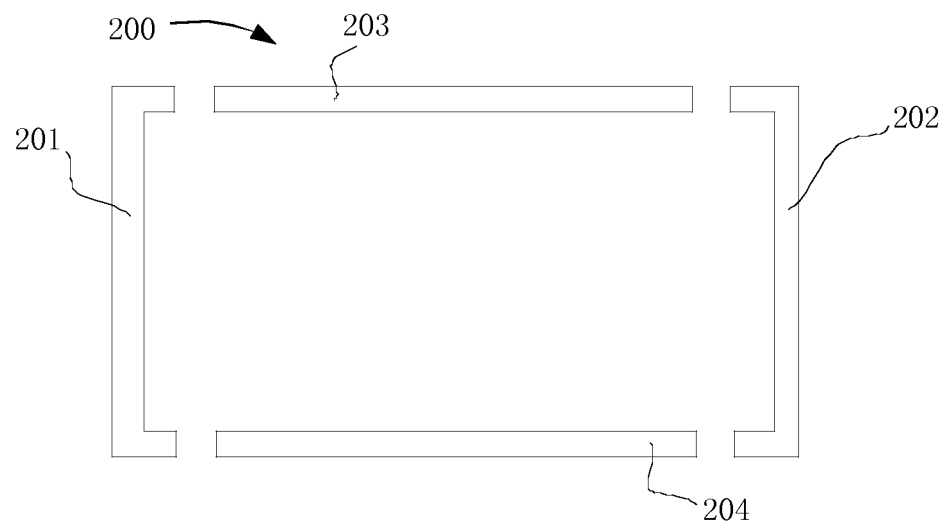
FIG. 4 is a simplified structure diagram of an outer frame of a first example of the invention.
Figure 5:
FIG. 5 is a simplified structure diagram of an outer frame of a second example of the invention.
Figure 6:
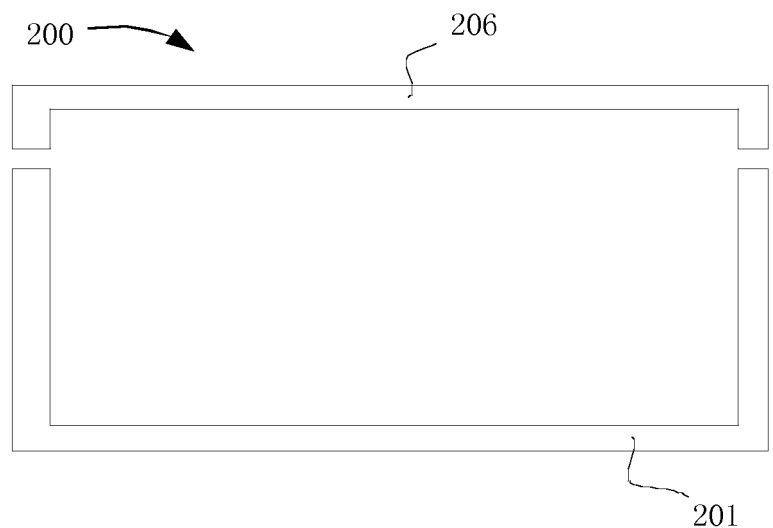
FIG. 6 is a simplified structure diagram of an outer frame of a third example of the invention.

FIGS. 4-6 show an outer frame of an LCD device of the invention, comprising a mounting section 201, and other sections; the mounting section 201 is used for arranging the light source of the backlight module, and the mounting section 201 is an independent section. Thus, the light source is arranged on the mounting section 201 of the outer frame when being assembled, the required assembling action is simple in the assembling process, and the assembling of the light source is completed when the outer frame is assembled; thus, the step of assembling the light source on the backplane or aluminum extrusion is omitted, and the assembling technology is simplified. In addition, when replacing the light source of the backlight module, only the mounting section of the outer frame is removed, and then the light source is replaced on the outer frame without removing components such as the LCD panel, the optical film, the LGP, etc. Thus, most components of the backlight module are exposed into air because many components are removed, causing dust to enter inside the backlight module to affect the optical performance of the backlight module can be avoided, the replacement process of the light source can be simplified, and the stability of the LCD device can be increased.

The following examples are several preferred examples of the invention.

Example 1

FIG. 4 shows a first example of the invention. As shown in the Figure, the outer frame 200 is of a square structure, and is divided into four sections comprising a mounting section 201, a top section 203, a bottom section 204, and a side section 202; the mounting section 201 is used for arranging the light source of the backlight module, and the four sections respectively form the four edge section of the outer frame 200. As shown in the Figure, all the four sections are straight sections, and can be formed by cutting the same strip-shaped original workblanks. Thus, the production efficiency of the outer frame 200 can be increased, and complicated molds are not needed, thereby saving the production cost.

In the example, because the light source is arranged on the mounting section 201, the mounting section 201 can be made of material with good heat dissipation effect such as aluminum material, copper material, etc. to increase heat dissipation efficiency.

Example 2

FIG. 5 shows a second example of the invention, and the second example is different from the first example in that: the outer frame 200 is divided into two sections comprising a mounting section 201 and a combining section 205; the mounting section 201 forms one edge section of the outer frame 200, and the combining section 205 is combined by the other three edge sections of the outer frame. Thus, the number of the sections is reduced, thereby facilitating the assembling of the outer frame 200, and increasing the assembling efficiency.

Example 3

FIG. 6 shows a third example of the invention, and the third example is different from the first example in that: the outer frame 200 is also divided into two sections; however, the third example is different from the second example in that: the mounting section 201 is combined by three edge sections of the outer frame 200, and the positioning section 206 is the rest edge section of the outer frame 200. The main aim of such arranging mode is to facilitate positioning and assembling. Because the light source is required to be accurately positioned, the mounting section 201 combined by the three edge sections is beneficial to the positioning of the light source.

Example 4

Figure 1:
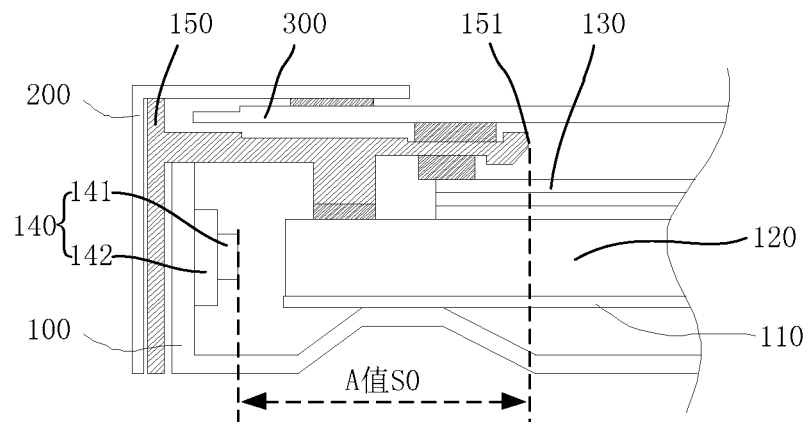
FIG. 1 is a simplified structure diagram of one conventional backlight module.
Figure 2:
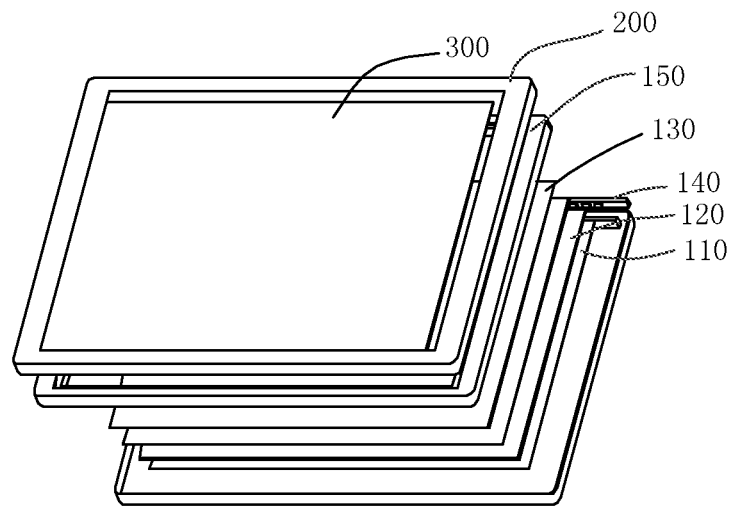
FIG. 2 is a simplified structure diagram of the removal and the assembly of a conventional LCD device.
Figure 3:
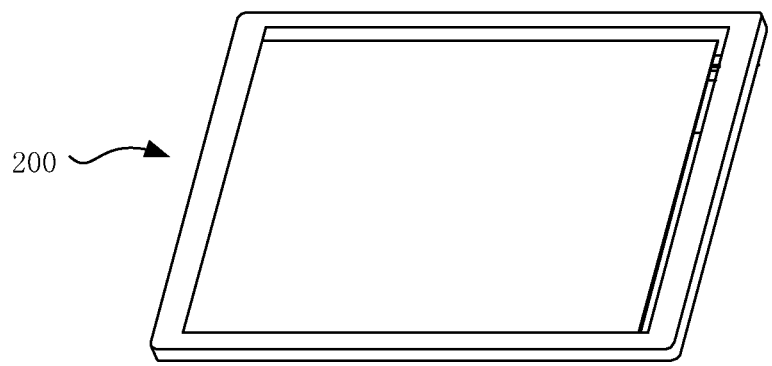
FIG. 3 is a simplified structure diagram of an outer frame of another conventional backlight module.
Figure 7:
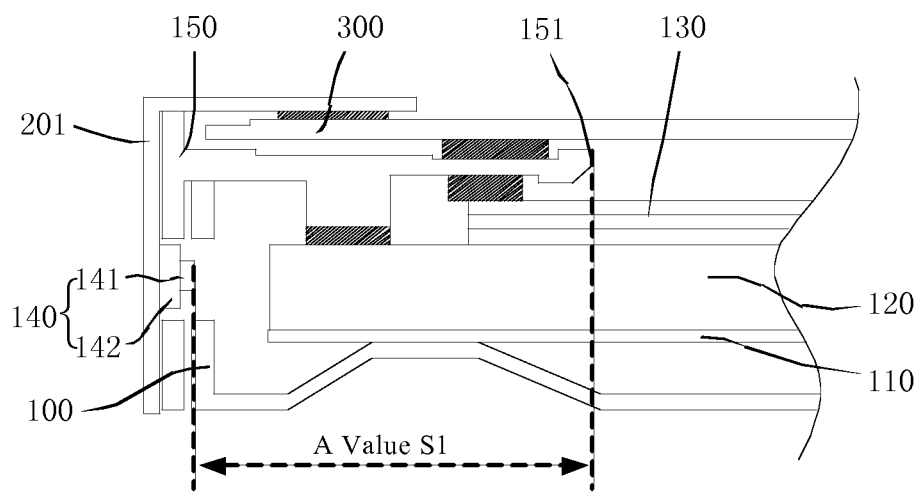
FIG. 7 is a simplified structure diagram of a backlight module of a fourth example of the invention.

FIG. 7 shows a fourth example of the invention. The backlight module of the LCD device comprises a backplane 100, a reflector plate 110 arranged on the backplane 100, an LGP 120 which is arranged on the reflector plate 110 and opposite to a lightbar 140, and a rubber frame 150 and an outer frame which are arranged outside the backplane 100 and used for pressing the LGP 120; an optical film 130 is arranged on the light emitting surface of the LGP 120, and an LCD panel 300 is fixed above the backlight module by components comprising the rubber frame 150, the outer frame and the like; the outer frame of the example is any of the outer frames of the first example, the second example and the third example. The light source is arranged on the mounting section 201 of the outer frame, the rubber frame 150 and the backplane 100 are provided with a receiving structure for receiving the light source 140 in the position corresponding to the light source 140. For example, the side walls of the rubber frame 150 and the backplane 100 can be provided with a notch in accordance with the set position of the light source 140. In the example, to prevent the strength of the rubber frame 150 and the backplane 100 from being strongly affected, the receiving structure is set into a through hole to form a depression extending to the outside of the backlight module in the position corresponding to the light source 140, to enable the distance between the light source and an inner edge 151 of the rubber frame 150 to be added; thus, the A value is added, the optical quality of the backlight module is increased, and the hotspot of the LCD device is removed. Suppose the thickness of the LED 141 is d1, the thickness of the PCB 142 is d2, the thickness of the side wall of the backplane 100 is d3, and the thickness of the side wall of the rubber frame 150 is d4, compared with the conventional backlight module shown in FIG. 1, the A value in the example is added about $S1=S1-S0=d3+d4$; thus, the A value S1 in the example is added about d3+d4 relative to the A value S0 of the conventional backlight module shown in FIG. 1. Therefore, because the A value S1 is added, dark zones occur outside the active area (AA area) of the LCD device shown in FIG. 10, thereby increasing the optical quality of the backlight module and the display effect of the LCD device.

In the example, because the light source 140 is directly arranged on the mounting section 201 of the outer frame, the mounting section 201 of the outer frame can be made of material with good heat dissipation effect such as aluminum material or other material to increase the heat dissipation efficiency of the backlight module.

Example 5

Figure 8:
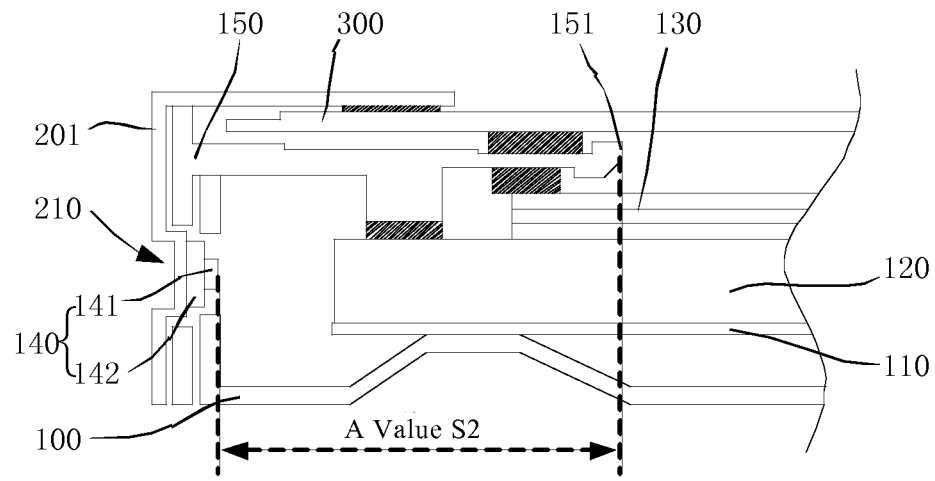
FIG. 8 is a simplified structure diagram of a backlight module of a fifth example of the invention.
Figure 10:
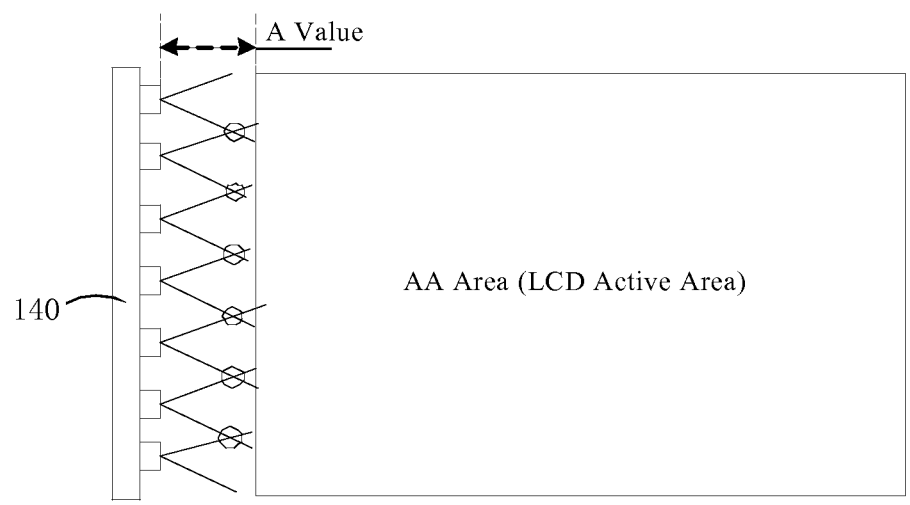
FIG. 10 is a schematic diagram of A values of a fourth example, a fifth example and a sixth example of the invention.

FIG. 8 shows a fifth example of the invention, and the fifth example is different from the fourth example in that: in the example, the mounting section 201 of the outer frame is provided with a lug boss 210 extending to the inside of the backlight module in the position corresponding to the light source, and the lug boss 210 corresponds to the depression formed by the through hole of the backplane 100 and the rubber frame 150; the aim is to facilitate positioning when assembling the backlight module, and increase the assembling accuracy and efficiency. As shown in FIG. 8, the A value S2 of the backlight module of the example is added about $S2=S2-S0=d1+d2$ relative to the A value S0 of the conventional backlight module shown in FIG. 1. Similarly, in this case, as shown in FIG. 10, dark zones formed between every two LEDs of the light source 140 occur outside the active area (AA area) of the LCD device, thereby increasing the optical quality of the backlight module and the display effect of the LCD device.

Similarly, because the light source 140 is arranged on the mounting section 201 of the outer frame, the mounting section 201 can be made of material with good heat dissipation effect such as aluminum material or other material to increase the heat dissipation efficiency of the backlight module.

Example 6

Figure 9:
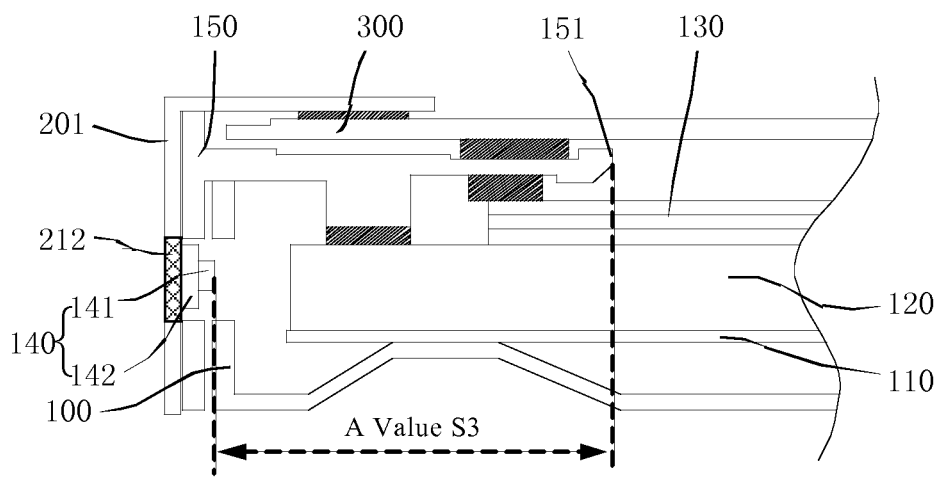
FIG. 9 is a simplified structure diagram of a backlight module of a sixth example of the invention.

FIG. 9 shows a sixth example of the invention, and the sixth example is different from the fourth example and the fifth example in that: the light source 140 of the example is further provided with a mounting strip 212, and the mounting strip 212 is fixed on the back of the light source 140 when manufacturing the light source 140. Correspondingly, the mounting section 201 is provided with an insert hole in the position corresponding to the light source 140, and the mounting strip 212 of the light source 140 is directly inserted in the insert hole in the mounting section 201 of the outer frame when assembling the light source 140. The assembling process is convenient and quick, being beneficial to increase the assembling efficiency of the backlight module.

In addition, in the example, because the mounting strip 212 is attached to the back of the light source 140, if the mounting strip 212 is made of material with good heat dissipation effect, the heat of the light source 140 can be dissipated out in time, and the heat dissipation efficiency of the backlight module can be increased.

The invention is described in detail in accordance with the above contents with the specific preferred examples. However, this invention is not limited to the specific examples. For the ordinary technical personnel of the technical field of the invention, on the premise of keeping the conception of the invention, the technical personnel can also make simple deductions or replacements, and all of which should be considered to belong to the protection scope of the invention.

I claim:

1. An LCD device, comprising: a light source, and an outer frame; wherein said outer frame comprises at least two sections; said sections comprise a mounting section for arranging the light source of a backlight module of a display device; said light source is fixed on the mounting section of said outer frame, wherein the outer frame comprises four edge sections, three of the edge sections are integrally formed to form a combining section independent from the mounting section, and the rest one edge section of the outer frame is the mounting section;

wherein said backlight module comprises a backplane, and a rubber frame; said backplane and the rubber frame are provided with a receiving structure for receiving said light source;

wherein said receiving structure is a through hole arranged in said backplane and said rubber frame corresponding to said light source;

wherein said light source is fixed on a strip-shaped mounting strip, said mounting section is provided with an insert hole in a position corresponding to said through hole, and said mounting strip is arranged in said insert hole.

2. The LCD device of claim 1, wherein said four edge sections comprise a top section, a bottom section and two side sections; said mounting section is any edge section of said top section, the bottom section and the two side sections, and the other three edge sections are integrally formed to form the combining section.

3. The LCD device of claim 1, wherein said is made of material with good heat dissipation effect.

4. The LCD device of claim 1, wherein the mounting section of the outer frame is provided with a lug boss extending to an inside of the backlight module in a position corresponding to the light source, and the lug boss corresponds to a depression formed by the through hole of the backplane and the rubber frame.

* * * * *